UNITED STATES PATENT OFFICE.

CHARLES HOWARD AARON, OF NOGALES, ARIZONA TERRITORY.

PROCESS OF PRECIPITATING NICKEL AND COBALT FROM SOLUTIONS CONTAINING THE SAME.

SPECIFICATION forming part of Letters Patent No. 330,454, dated November 17, 1885.

Application filed February 26, 1885. Serial No. 157,119. (No specimens.)

*To all whom it may concern:*

Be it known that I, CHARLES H. AARON, of Nogales, Pima county, Arizona Territory, have invented an Improvement in Processes of Precipitating Nickel and Cobalt from Solutions of Same; and I hereby declare the following to be a full, clear, and exact description of the same.

My invention relates to a process for separating nickel and cobalt from ores or metallurgical products with which they may be associated.

It consists in precipitating nickel and cobalt from a solution in the form of zanthates or methylsulpho-carbonates, as will be more fully explained in the following specification. The substance is treated in any of the usual ways, by means of acid, or by roasting and lixiviation, so as to obtain a solution of salts of nickel or cobalt, or of both, and which may also contain salts of other substances. The solution may then be treated in any usual way for the removal of iron, copper, lead, bismuth, and silver, if present. It is not necessary to remove zinc, manganese, arsenic, tellurium, selenium, or any earths, alkaline earths, or alkalies which the solution may contain, any or all of which, for the purposes of this process, may remain in the liquid, if present therein. The solution should be neutral or but slightly acid. To the solution thus prepared I add an aqueous solution of a soluble zanthate, or the corresponding methylsulpho-carbonate may be used in the place of zanthate. By this means the nickel and cobalt in the solution are precipitated as zanthates or methylsulpho-carbonates, while the other substances remain in the solution, if present. I may use for the purpose described either the solid zinc methylsulpho-carbonates or an aqueous solution of an alkali methylsulpho-carbonate, or an aqueous solution of an alkaline earth methylsulpho-carbonate, and, further, in general I prefer the sodium salt, on account of its being easily made and on account of its comparatively low molecular weight. The precipitate is collected and washed, and may then be dried and calcined, yielding the oxide of nickel or of cobalt, or a mixture of both, if both metals be present; or the mixed precipitate may be treated with ammonia before calcination. The ammonia dissolves only the nickel compound in this case, and the cobalt compound may be collected, dried, and calcined. The nickel compound is precipitated from the ammoniacal solution by neutralizing the latter, the nickel compound then being collected, dried, and calcined.

While I obtain the original solution by such common means as may be suitable under given circumstances, I further prepare it for my purpose by stirring in zinc-carbonate, which instantly decomposes (per) salts of iron and quickly removes every trace of bismuth, copper, &c. This must be done in the cold or but slightly warm solution, and it leaves the liquid perfectly neutral, without loss of nickel or cobalt. This treatment alone, however, would not be feasible in case copper, &c., were present in large quantity, and in that case, or where it might be desirable to recover copper, &c., I should rely, in part or wholly, on usual or well-known means of accomplishing that. The ammoniacal solution may be treated by other means, which may be made the subjects of other applications for patents.

I am aware the use of zanthates in precipitating nickel and cobalt from solution is not broadly new, and such I do not broadly claim as my invention.

Having thus described my invention, what I claim as new, and desire to secure by Letters Patent, is—

The metallurgical process consisting in precipitating nickel or cobalt, or both together from their solutions in the form of methylsulpho-carbonates, substantially as described.

In witness whereof I have hereunto set my hand.

CHARLES HOWARD AARON.

Witnesses:
S. G. HARPER,
SWAN P. NELSON.